Figure 7:
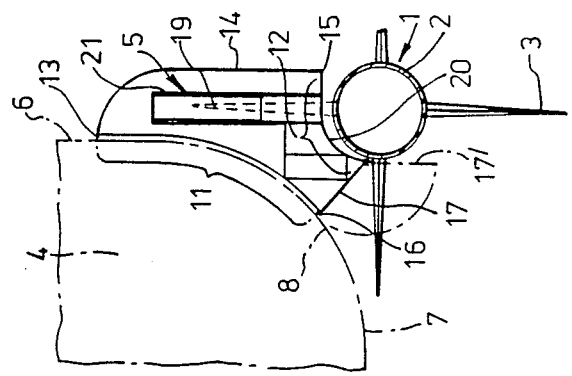

United States Patent [19]

Ash et al.

[11] Patent Number: 4,756,227
[45] Date of Patent: Jul. 12, 1988

[54] STORE CARRIER FOR AIRCRAFT

[75] Inventors: Geoffrey J. Ash; Douglas F. Kerr; Richard D. Greenhalgh, all of Preston, United Kingdom

[73] Assignee: British Aerospace PLC, Weybridge, England

[21] Appl. No.: 237,393

[22] Filed: Jan. 21, 1981

[30] Foreign Application Priority Data

Jan. 22, 1980 [GB] United Kingdom ............... 8002177

[51] Int. Cl.⁴ .......................... F41F 3/06; B64D 1/00
[52] U.S. Cl. .................................. 89/1.57; 244/137.1
[58] Field of Search ............... 89/1.5 F, 1.5 G, 1.5 H, 89/1.5 C, 1.8, 1.819, 1.806, 1.812, 1.815; 244/137 R, 130, 118.1

[56] References Cited

U.S. PATENT DOCUMENTS

| | | | |
|---|---|---|---|
| 2,699,908 | 1/1955 | Fletcher | 244/137.1 |
| 2,706,431 | 4/1955 | Grill | 89/1.819 |
| 2,736,522 | 2/1956 | Wilson | 244/137.1 |
| 2,865,582 | 12/1958 | Price | 89/1.57 |
| 2,865,584 | 12/1958 | Holloway | 89/1.57 X |
| 2,940,362 | 6/1960 | Paxton | 89/1.806 |
| 3,008,376 | 11/1961 | Brunow et al. | 89/1.54 |
| 3,040,629 | 6/1962 | Duncan et al. | 89/1.819 X |
| 3,186,301 | 6/1965 | Buschers | 89/1.819 |

FOREIGN PATENT DOCUMENTS

| | | | |
|---|---|---|---|
| 1526221 | 4/1968 | France | 244/137.1 |
| 744609 | 2/1956 | United Kingdom | 244/137.1 |
| 1441827 | 7/1956 | United Kingdom | 244/118.1 |
| 2017617 | 10/1979 | United Kingdom | 244/137.1 |

Primary Examiner—David H. Brown
Attorney, Agent, or Firm—Cushman, Darby & Cushman

[57] ABSTRACT

A Store Carrier 5 for the external carriage of stores adjacent an aircraft body comprises an aircraft body engaging region 11, a store accepting region 12, and a fairing region 14/17 connecting an edge of the aircraft body engaging region with an edge of the store accepting region. The Store Carrier houses store ejection means having a store engaging portion 20 and an elongate portion 21, the elongate portion lying between the fairing region and the aircraft body engaging region.

One of the uses of the Store Carrier is to carry a finned missile 1 closely adjacent an aircraft body.

7 Claims, 4 Drawing Sheets

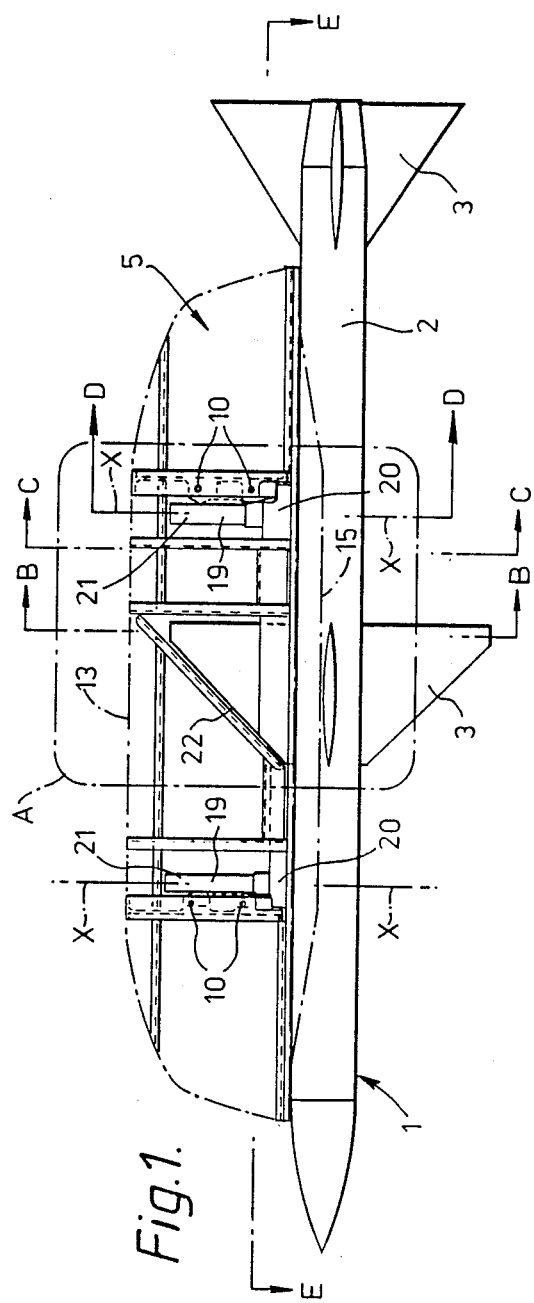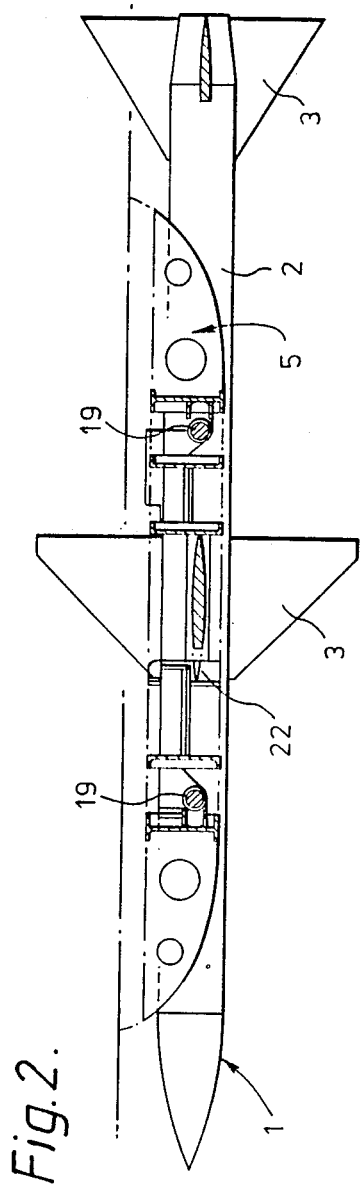
Fig.1.
Fig.2.

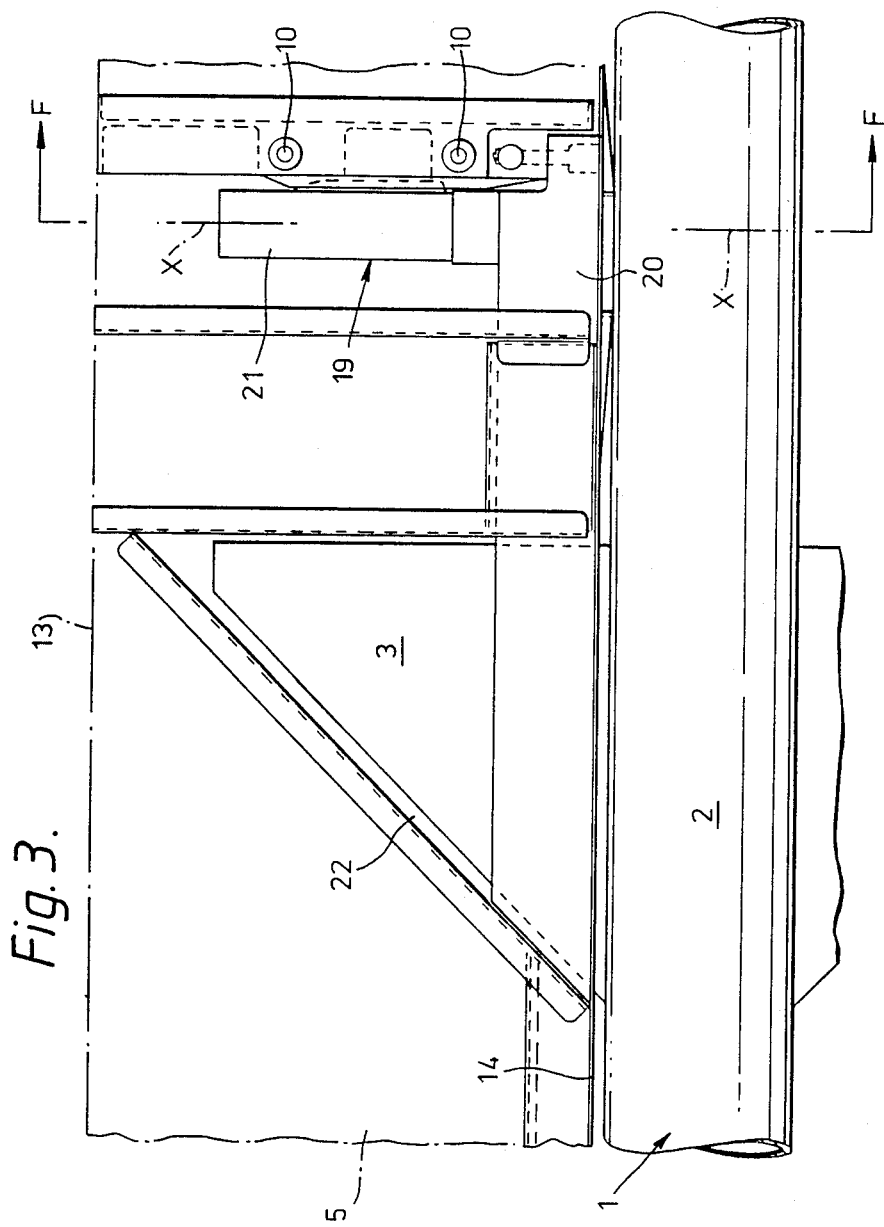

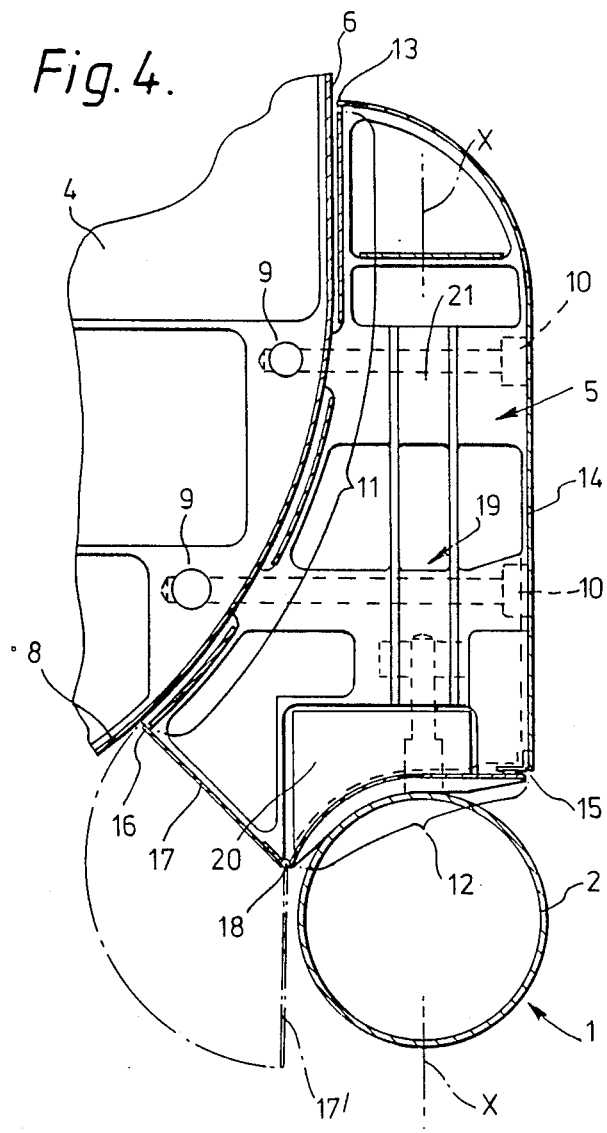

STORE CARRIER FOR AIRCRAFT

This invention relates to store carriers which in use are mounted externally of the body of a carrier aircraft for the carriage of stores and their subsequent release and ejection.

In this specification the term 'stores' includes such items as guided or unguided weapons, fuel tanks, and equipment pods which are ejectable as a matter of course or as a matter of emergency.

Similarly, references relating to attitude such as vertical, horizontal, up, or down, relate to items associated with an aircraft, when that aircraft is in straight and level flight.

This invention is primarily concerned with those store carriers which are arranged to include ejection means of elongate form, having considerable length along their axis of ejection. Such ejection means can be, for example, a long stroke fluid operated ram which is effective to urge a store away from its carried position.

Hitherto, to accommodate such elongate ejection means, either the store carrier was designed such that the ejection means in use remained exterior to the aircraft body contour, in which case a carried store lay well away from the body with attendant drag and load transmitting problems, or, alternatively, the store carrier was designed such that the ejection means in use penetrated the aircraft contour, in which case a carried store lay close to the aircraft body but the body required local structural modifications.

An object of the present invention is, accordingly, the provision of a store carrier which is so shaped that in use a carried store lies relatively close to the aircraft body contour but that no part of the ejection means or carried store penetrates that contour.

Naturally, the invention is also, but not primarily, applicable to store carriers which carry ejector means of non-elongate form since, irrespective of which type of store ejection means it utilises, the invention provides convenient carriage for stores closely to the aircraft body.

According to one aspect of the present invention, there is provided a store carrier for the external carriage of a store on an aircraft, which carrier includes body means elongate in substantially the normal direction of flight of the aircraft and having an aircraft body engaging region, a store accepting region and a fairing region connecting an edge of the aircraft body engaging region with an edge of the store accepting region, the regions and their edges being generally aligned with the normal direction of flight of the aircraft, the elongate body means being arranged to mount store ejection means of the type having a store engaging portion and an elongate portion, with the store engaging portion located at or adjacent the store accepting region and the elongate portion lying within the body means and between the fairing region and the aircraft body engaging region.

The body means preferably also includes a further fairing connecting a further edge of the aircraft body engaging region with a further edge of the store accepting region.

When the aircraft on which the store carrier to be mounted has a body with a generally planar surface region and a generally convex surface region contiguous therewith, both surfaces being generally aligned with the normal direction of flight of the aircraft, the aircraft body engaging region is preferably configured to engage said planar surface and said convex surface regions; it is thus generally of concave form.

Similarly, the store accepting region is preferably of concave form.

Conveniently, at least one of the fairings includes hinge means to enable it to be hinged away from the remainder of the store carrier body to allow access to the inside of the carrier body.

In another aspect of this invention, there is provided an aircraft having a body with a generally planar surface region and a generally convex surface region contiguous with the planar surface region, both surface regions being generally aligned with the normal direction of flight of the aircraft, includes a removable store carrier having carrier body means elongate in the normal direction of flight of the aircraft, the carrier body having an aircraft body engaging region configured to engage said planar aircraft surface region and said convex aircraft surface region, a store accepting region, a fairing region connecting an edge of the aircraft body engaging region with an edge of the store accepting region, the regions and their edges being generally aligned with the normal direction of flight of the aircraft, the elongate body means being arranged to mount store ejection means of the type having a store engaging portion and an elongate portion, with the store engaging portion located at or adjacent the store accepting region and the elongate portion lying within the body means between the fairing region and the aircraft body engaging region.

Where the aircraft is adapted to receive in its store accepting region a missile having a substantially tubular body means and a plurality of fins extending transversely therefrom, with the body being generally aligned with the normal direction of flight of the aircraft, and the aircraft includes two perpendicular generally planar surface regions bridged by a generally convex surface region, the elongate portion of the store engaging means preferably lies substantially parallel to one of the generally planar surface regions. A recess may conveniently be provided within the carrier body which recess is adapted to receive a fin of the missile to lie alongside, but spaced from, the one generally planar surface region, whilst a second, adjacent fin of the missile extends alongside, but spaced from the other generally planar surface region. This arrangement allows the missile to be positioned relatively closely to the body of the aircraft, whilst neither the fins of the missile, nor the store ejection means penetrate the aircraft body.

Figure 6:
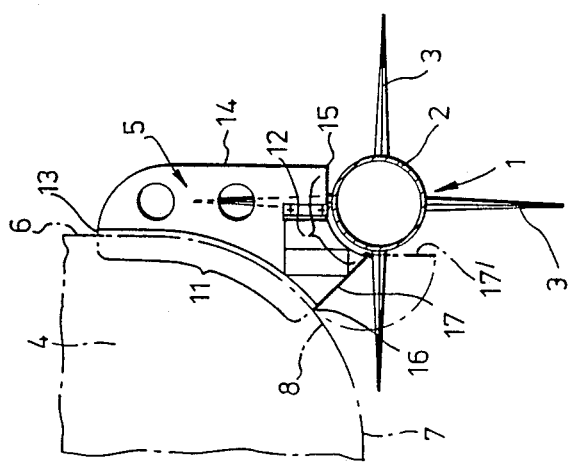
Figure 5:
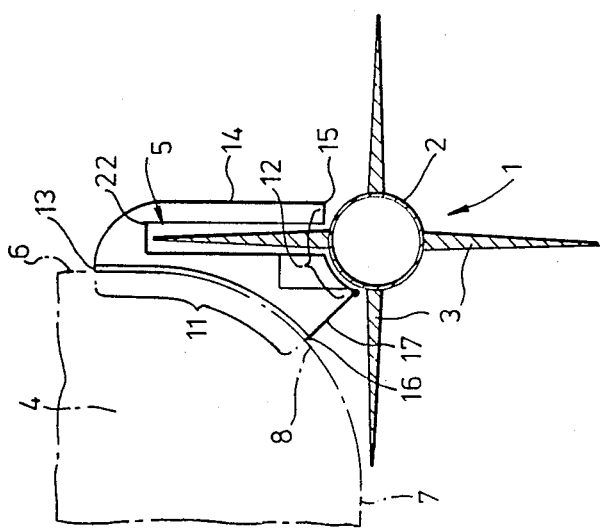

One embodiment of the invention is described by way of example with reference to the accompanying drawings in which:

FIG. 1 is a side elevation of a store carried by a store carrier in a flight position, FIG. 2 is a cross-sectional plan view of FIG. 1, the cross section being upon Arrows II—II, FIG. 3 is an enlarged view of that region in box III of FIG. 1, FIG. 4 is a cross-sectional view upon Arrows IV—IV of FIG. 3, and, FIGS. 5, 6, and 7 are cross-sectional views upon Arrows V—V, VI—VI, and VII—VII, respectively of FIG. 1.

Both FIGS. 1 and 3 have a skin portion of the store carrier removed to illustrate structural details.

In the Figures, a store 1 (which in this instance is a guided weapon with a tubular body 2 and two spaced sets of cruciform fins 3) is carried externally of an aircraft fuselage 4 on a store carrier referenced 5.

The fuselage is shown only in FIGS. 4, 5, 6, and 7, and, as illustrated therein, has a vertical surface region 6, a horizontal surface region 7, and a convex surface region 8 extending between the two. These are fuselage side regions and, as such, are generally aligned with the line of flight of the aircraft.

The fuselage has vertically spaced strengthened regions 9 which contain anchorages for engagement by laterally extending bolts 10 associated with the store carrier.

The store carrier has a body of elongate form with a generally concave fluted fuselage engaging region 11 configured to lie closely adjacent, that is to say engage, a region of the aircraft surface including, as drawn, that region 6 and that region 8, and a further concave fluted store accepting region 12 within which a store body can be partly accommodated. Both regions are generally aligned with the direction of flight of the aircraft when the store carrier is in use.

An upper edge 13 (as drawn) of the fuselage engaging region 11 is connected by a generally convex first surface region 14 to an outboard edge 15 (as drawn) of the store accepting region 12, whilst a lower edge 16 (as drawn) of the fuselage engaging region 11 is connected by a generally flat second surface region 17 to an inboard edge 18 (as drawn) of the store accepting region 12.

The shape of the body in cross section, that is to say, the disposition of the regions 11 and 12, and the surface regions 14 and 17 are such to accommodate store ejection means in the form of fluid operated rams 19. These rams 19, of which two are provided, each have a store engaging portion 20 which lies in the store accepting region 12 and also an elongated ram housing portion 21 which lies between the region 11 and the surface region 14. As drawn the axis X—X along which the ram extends, lies parallel to the vertical surface region 6 of the aircraft.

To provide access to the store ejection means and any other equipment housed within the body the second surface region 17 is formed as a door to swing downwards as illustrated at 17' in FIGS. 4, 6 and 7.

As drawn, the vertical fin of one cruciform group 3 is arranged to lie within a cavity 22 formed within the body of the store carrier so that it can lie between the region 11 and the surface region 14 in the same plane as the rams 19. In this case a horizontal fin of the group 3 lies under the fuselage parallel to the horizontal surface 7. Thus the weapon can lie closely adjacent the aircraft fuselage in a relatively low drag position.

As an alternative to the illustrated embodiment, the store carrier can be configured to lie on an aircraft with the plane of its ram axis X—X horizontal instead of vertical either at the top or bottom f a fuselage. Similarly, it can lie at the top of a fuselage with the plane of its ram axis X—X vertical, in other words inverted compared with the illustrated embodiment.

Although the illustrated embodiment is described with respect to an aircraft fuselage, the store carrier can equally well be carried upon some other body of the aircraft, for example a nacelle.

We claim:

1. A Store Carrier for the external carriage of a store on an aircraft, which carrier includes:

body means elongate in substantially the normal direction of flight of the aircraft and having an aircraft body engaging region, a store accepting region and a fairing region connecting an edge of said aircraft body engaging region with an edge of said store accepting region, said regions and their edges being generally aligned with the normal direction of flight of the aircraft, said elongate body means being arranged to mount store ejection means of the type having a store engaging portion and an elongate portion, with said store engaging portion located at or adjacent said store accepting region and said elongate portion lying within said body means and between said fairing region and said aircraft body engaging region, wherein the body means further includes a further fairing connecting a further edge of the aircraft body engaging region with a further edge of the store accepting region and wherein at least one of the fairings includes hinge means to enable it to be hinged away from the remainder of the store carrier body to allow access to the inside of said carrier body.

2. A Store Carrier as claimed in claim 1, wherein the aircraft body engaging region is of generally concave form and is adapted to engage a portion of an aircraft defined by a first generally planar surface region, and a generally convex surface region contiguous therewith, both said surface regions of the aircraft being generally aligned with the normal direction of flight of the aircraft.

3. A Store Carrier as claimed in claim 1, wherein the store accepting region is of generally concave form.

4. An aircraft having a body portion including a generally planar surface region and a generally convex surface region contiguous with the planar surface region, both said surface regions being generally aligned with the normal direction of flight of the aircraft, which includes a removable store carrier having carrier body means elongate in the normal direction of flight of the aircraft, said carrier body means having an aircraft body engaging region configured to engage said planar aircraft surface region and said convex aircraft surface region, a store accepting region, a fairing region connecting an edge of said aircraft body engaging region with an edge of said store accepting region, said regions and their edges being generally aligned with the normal direction of flight of the aircraft, said carrier body means being arranged to mount store ejection means of the type having a store engaging portion and an elongate portion with the store engaging portion located at or adjacent said store accepting region and the elongate portion lying within said body means between said fairing region and said aircraft body engaging region.

5. An aircraft according to claim 4 adapted to receive in its store accepting region a missile having substantially tubular body means and a plurality of fins extending transversely therefrom, with the tubular body means being generally aligned with the normal direction of flight of the aircraft, which aircraft includes a further generally planar surface region contiguous with the generally convex surface region, remote from said first generally planar surface region and substantially perpendicular thereto, and the elongate portion of the store engaging means lies substantially parallel to said first generally planar surface region, there being a recess provided in the carrier body means adapted to receive a fin of the missile to lie alongside, but spaced from, said planar surface region, whilst a second, adjacent fin of the missile extends alongside, but spaced from, said further generally planar surface region, whereby said missile is carried relatively close to he aircraft body yet neither the fins of the missile nor the store ejection means penetrate the aircraft body.

6. An aircraft according to claim 4 or claim 5, wherein the removable store carrier body means includes a further fairing region connecting a further edge of the aircraft body engaging region with a further edge of the store accepting region.

7. An aircraft according to claim 6, wherein at least one of the fairing regions includes hinges means to enable it to be hinged away from the remainder of the Store Carrier body means to allow access to the inside of said body means.

* * * * *